US012596789B2

(12) United States Patent
Palanki et al.

(10) Patent No.: US 12,596,789 B2
(45) Date of Patent: Apr. 7, 2026

(54) LARGE LANGUAGE MODEL (LLM) INTERACTION SECURITY SANDBOX

(71) Applicant: American Express Travel Related Services Company, Inc., New York, NY (US)

(72) Inventors: Hiranmayi Palanki, Tampa, FL (US); Shankar Djeyassilane, Markham (CA)

(73) Assignee: American Express Travel Related Services Company, New York, NY (US)

( * ) Notice: Subject to any disclaimer, the term of this patent is extended or adjusted under 35 U.S.C. 154(b) by 125 days.

(21) Appl. No.: 18/510,382

(22) Filed: Nov. 15, 2023

(65) Prior Publication Data

US 2025/0156527 A1     May 15, 2025

(51) Int. Cl.
*G06F 21/53*          (2013.01)
*G06F 40/20*          (2020.01)

(52) U.S. Cl.
CPC ............. *G06F 21/53* (2013.01); *G06F 40/20* (2020.01)

(58) Field of Classification Search
CPC ................................ G06F 21/53; G06F 40/20
See application file for complete search history.

(56) References Cited

U.S. PATENT DOCUMENTS

| | | | |
|---|---|---|---|
| 2024/0193374 A1* | 6/2024 | Wolfe ..................... | G06F 40/30 |
| 2024/0388551 A1* | 11/2024 | AlFardan .............. | H04L 51/212 |
| 2024/0427994 A1* | 12/2024 | Odland ..................... | G06N 3/08 |
| 2025/0039219 A1* | 1/2025 | Mirkis .................. | G06F 21/554 |
| 2025/0103746 A1* | 3/2025 | Gharibi .............. | G06F 21/6227 |

\* cited by examiner

*Primary Examiner* — Beemnet W Dada
(74) *Attorney, Agent, or Firm* — Thomas Horstemeyer, LLP

(57)          ABSTRACT

Disclosed are various approaches for large language model (LLM) interaction security sandboxing. A client device can execute an LLM security sandbox that includes at least one LLM communications sanitization process. The LLM security sandbox can perform the at least one LLM communications sanitization process on the LLM message to generate an approved LLM message. The client device can provide access to the approved LLM message by at least generating a user interface that includes the approved LLM message, or transmitting the approved LLM message from the client device to the LLM service.

20 Claims, 5 Drawing Sheets

160

START

Generate an LLM Security Sandbox    ~ 403

Identify an LLM Message    ~ 406

Provide the LLM Message to the
LLM Security Sandbox    ~ 409

Receive an Approved Message
from the LLM Security Sandbox    ~ 412

Forward the Approved Message    ~ 415

END

120

LARGE LANGUAGE MODEL (LLM) INTERACTION SECURITY SANDBOX

BACKGROUND

Large language models (LLMs) are expanding the use of artificial intelligence (AI) exponentially. As this expansion continues, companies developing LLMs will contend with the challenges of ensuring the security of large amounts of data. The security of the data in the LLM itself is important, as are the responses that it creates for users. One of the significant concerns is the potential for misuse and errors introduced by the ubiquitous use of LLMs. These models can generate highly realistic and coherent text, making them a tool with the ability to provide great utility as well as great harm.

Their potential for misuse is concerning, enabling the creation of deceptive and inaccurate content. Biases can perpetuate unfair commentary that can contribute to societal problems. LLMs also raise privacy concerns as they could inadvertently generate text containing sensitive personal and enterprise information. As the use of LLMs proliferates, there is a need for enterprises to have a way to ensure that applications and programmatic usage of an LLM is safe, secure, and free from the various LLM specific issues. There is a further need to ensure that this safety has been tested at various points of development.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
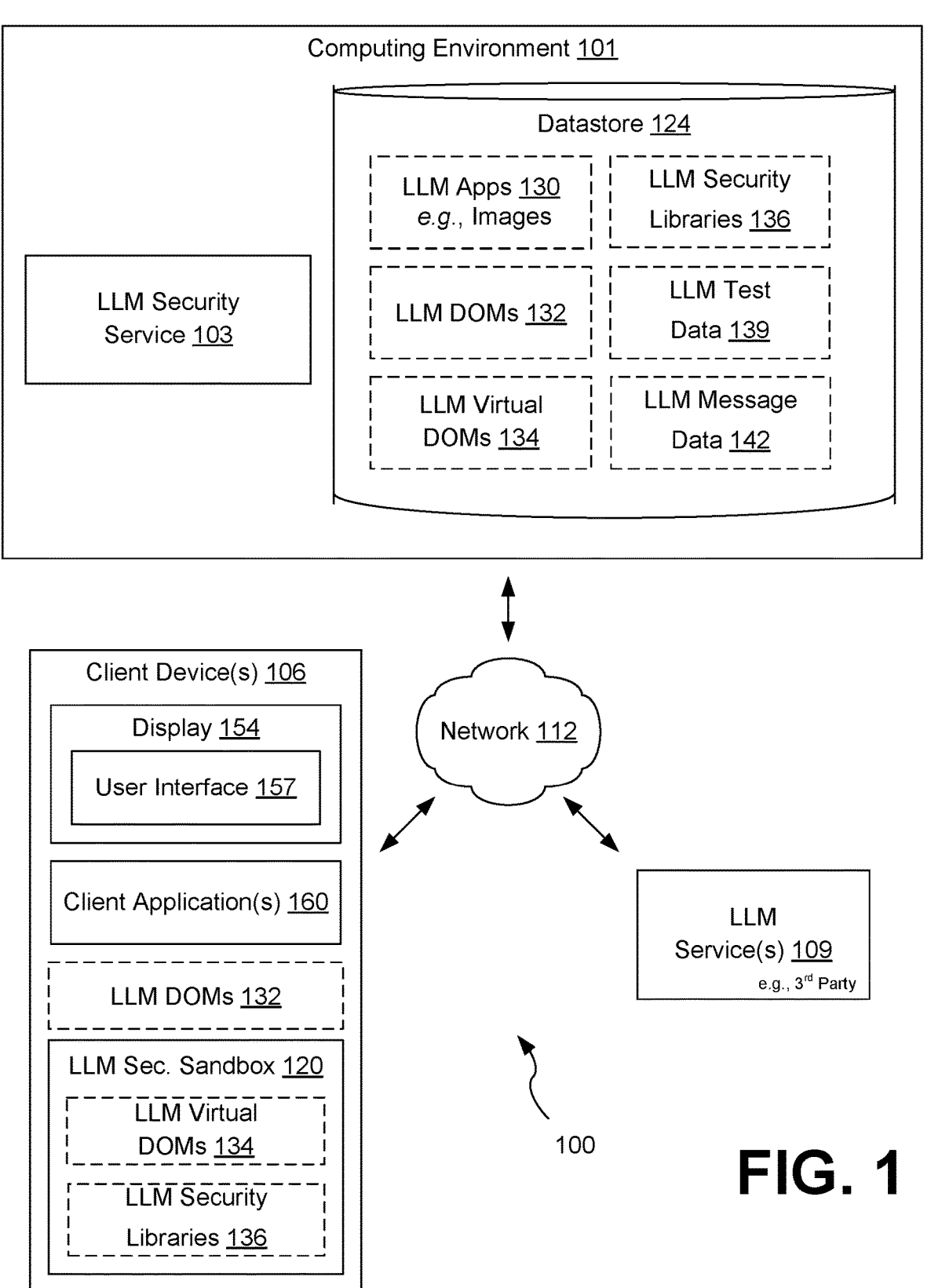
FIG. 1 is a drawing of a networked environment that includes components for large language model (LLM) interaction security sandboxing according to various embodiments of the present disclosure.

Disclosed are various approaches for large language model (LLM) interaction security sandboxing. LLMs can generate highly realistic and coherent text, making them a tool with the ability to provide great utility as well as great harm. Accordingly, LLMs are expanding in use. As this expansion continues, enterprises developing LLMs and applications that interact with LLMs will contend with the challenges of ensuring the security of large amounts of data. The security of the data in the LLM itself is important, as are the responses that it creates for users. One of the significant concerns is the potential for misuse and errors introduced by the LLMs.

The potential for misuse of LLMs is concerning, enabling the creation of deceptive and inaccurate content. Biases can perpetuate unfair commentary that can contribute to societal problems. LLMs also raise privacy concerns as they could inadvertently generate text containing sensitive personal and enterprise information. As the use of LLMs proliferates, there is a need for enterprises to have a way to ensure that applications using an LLM, and programmatic usage of an LLM, is safe, secure, according to specific types of tests performed at various points of development.

Existing technologies fail to provide a client-side solution to protect devices from harmful, insecure, and undesirable content. As a result, existing technologies rely on users of a client device to self-regulate their inputs for LLMs to prevent inclusion of Secure Data Elements (SDEs), harmful content, biases, malicious prompt injections, and so on. Existing technologies also rely on the LLM to omit harmful content, biases, malicious prompt injections, and LLM hallucinations. However, users can make mistakes, and LLMs and services providing the LLMs may have differing desired protections on content. The mechanisms described in the present disclosure provide a sandboxed environment for sanitizing LLM interactions including messages provided as inputs to an LLM, and messages provided as responses from the LLM. The input sanitation can include checking for SDEs, harmful content, biases, malicious prompt injections, and so on. The output sanitation can include checking for harmful content, biases, malicious prompt injections, and LLM hallucinations. The input and output sanitation services can then forward an approved message that can include an original message or a sanitized message. The sanitized message can be a modified version of the original message. In some examples, the sanitized message can be generated using a moderator LLM provided within the sandboxed environment. The system can also provide an indication to a user that the message is sanitized.

In this context, as one skilled in the art will appreciate in light of this disclosure, embodiments can achieve certain improvements and advantages over traditional technologies, including some or all of the following: (1) improving the functioning of computer systems and networks, as well as the efficiency of using mobile and other client devices by increasing a speed of responsiveness in mobile and client devices by deployment of a security sandbox rather than using server-side protections individual devices; (2) improving the functioning of computer systems and networks, including reducing power consumption and network bandwidth usage, by deployment of the security sandbox rather than transmitting data for further server-side processing; (3) improving the functioning of computer systems including the efficiency of using mobile and other client devices by preventing the user from having to open multiple applications, websites, and other interfaces to search and identify whether any of the terms and information entered and received is not allowed according to enterprise rules and guidelines, and so forth.

In the following discussion, a general description of the LLM interaction security sandboxing system is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1, shown is a networked environment 100 according to various embodiments. The networked environment 100 can include a computing environment 101 for an LLM security service 103, a client device 106, and LLM services 109, which can be in data communication with each other via a network 112. Although depicted and described separately, the LLM service 109 can also be included in or operate as a subcomponent of the computing environment 101 and/or the LLM security service 103 in various embodiments of the present disclosure.

The network 112 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 101 can include one or more computing devices that include a processor, a memory, and/or a network interface. For example, the computing devices can be configured to perform computations on behalf of other computing devices or applications. As another example, such computing devices can host and/or provide content to other computing devices in response to requests for content. The computing environment 101 can provide an environment for the LLM security service 103 and other executable instructions.

Moreover, the computing environment 101 can employ a plurality of computing devices that can be arranged in one or more server banks or computer banks or other arrangements. Such computing devices can be located in a single installation or can be distributed among many different geographical locations. For example, the computing environment 101 can include a plurality of computing devices that together can include a hosted computing resource, a grid computing resource or any other distributed computing arrangement. In some cases, the computing environment 101 can correspond to an elastic computing resource where the allotted capacity of processing, network, storage, or other computing-related resources can vary over time. Various applications or other functionality can be executed in the computing environment 101. The components executed on the computing environment 101 include a LLM security service 103, and other applications, services, processes, systems, engines, or functionality not discussed in detail herein.

Various data is stored in a datastore 124 that is accessible to the computing environment 101. The datastore 124 can be representative of a plurality of datastores 124, which can include relational databases or non-relational databases such as object-oriented databases, hierarchical databases, hash tables or similar key-value datastores, as well as other data storage applications or data structures. Moreover, combinations of these databases, data storage applications, and/or data structures can be used together to provide a single, logical, datastore. The data stored in the datastore 124 is associated with the operation of the various applications or functional entities described below. The data is stored in a datastore 124 can include data stored in repositories of a repository service.

The data is stored in a datastore 124 can include LLM applications 130, the LLM Document Object Models (DOMs) 132, the LLM virtual DOMs 134, LLM security libraries 136, LLM test data 139, and LLM message data 142, among other items which can include executable and non-executable data. Each of the repositories 127 can include one or more LLM applications 130. An LLM application 130 can represent an image of an application that interacts with one or more LLM services 109. The LLM application 130 can be referred to as an LLM interaction application.

An LLM DOM 132 can refer to a web page document of a web page provided as an interface for an LLM service 109 and its LLM. The LLM DOM 132 can include interfaces generated using the LLM security service 103 itself or an LLM application 130 protected using the LLM security service 103 and the LLM security sandboxes 120. The LLM DOM 132 can include a full representation of a web page structure and content for a web browser, and can act as a model for the browser's rendering engine. The web page can include a page generated using an LLM application 130, the LLM security service 103, or another component of the computing environment 101. To this end, the LLM security service 103 can provide data and instructions that include or enable the client device 106 to generate the LLM security libraries 136, the LLM DOM 132, the LLM virtual DOM 134, the LLM security sandbox 120, and other components.

An LLM virtual DOM 134 can be a virtual representation of an LLM DOM 132. The LLM virtual DOM 134 can be a lightweight in-memory representation of the LLM DOM 132, which can include a data structure made up of logical objects represented in code to mimic the structure of the LLM DOM 132 without containing the full data contents of the LLM DOM 132. When a program such as the LLM application 130, an LLM security service, or a component of the LLM security sandbox 120 makes changes to a web page, changes can be made to the LLM virtual DOM 134 rather than the LLM DOM 132. This can optimize rendering and updating of a web page that interacts with an LLM.

The LLM security libraries 136 can include a security framework of pre-built software components. The LLM security libraries 136 can include all or a subset of LLM tests outlined in the LLM test data 139. The LLM security libraries 136 can include components that can implement or invoke the LLM tests. The LLM security libraries 136 can define security actions such as tests that should be performed for LLM inputs and LLM responses.

An LLM test can generate a test result such as a score or value. In some examples, an LLM message can be approved or disapproved based at least in part on the scores indicated using the test results. An LLM test can also include a type-specific LLM that is trained to take an original message as input, generate a modified message and a moderator comment. The modified message can be provided to the each LLM test in turn. A consolidation LLM can consolidate all of the moderator messages into a succinct paragraph or sentence that describes the reasons for all of the modifications. In other examples, a single moderator LLM can concurrently perform all of the modifications and generate a succinct paragraph or sentence that describes the reasons for all of the modifications.

The LLM security libraries 136 can also include or reference a moderator LLM that is to be used to modify LLM inputs and LLM responses that are improper, insecure, or otherwise disapproved. Each type of LLM message, including LLM input messages and LLM response messages, can be associated with all or a subset of the LLM tests identified in the LLM security libraries 136. The moderator LLM can be compact or limited in size so that it can be executed within the LLM security sandbox 120 on a client device 106. The moderator LLM can take inputs including a message history for a particular chat session, and a "new" or most recent message. The moderator LLM can be trained to modify the message to provide a sanitized message. In some cases, the moderator LLM can be invoked to modify the message if the original message of the message fails one or more of the LLM tests. In some examples, the sanitized message can be then tested, and the process can continue a predetermined number of iterations until the sanitized message passes the LLM tests. The moderator LLM can also generate a moderation statement in association with the modified LLM message, indicating how and why the LLM message was modified.

LLM test data 139 can include a list of LLM specific tests that are to be applied for LLM interaction security using the LLM security sandbox 120. LLM test data 139 can include the tests themselves as executable code that performs a test in an automated programmatic fashion. LLM specific tests can involve tests that address security concerns related to LLMs. For example, harmful content tests, bias mitigation tests, SDE leakage prevention tests, malicious prompt injection tests, hallucination tests, and so on.

A harmful content filtering test can include an automated evaluation that involves the identification and removal of offensive, inappropriate, or dangerous material. Harmful content an include explicit content, hate speech, cyberbullying, misinformation, scams, and so on. Harmful content filtering tests can include ensuring that a message does not provide harmful content to an LLM service 109. Harmful content filtering tests can include testing the response from the LLM service 109 for harmful content.

A bias mitigation test can include an automated evaluation that identifies and addresses biases in a message. It involves measuring bias in LLM messages to or from LLM services 109. Bias mitigation tests can include testing and filtering the response from the LLM service 109 for biases.

An SDE leakage test can include an automated evaluation that ensures that sensitive data elements are not provided or transmitted as input messages to an LLM service 109. An SDE leakage test involves checking the LLM messages for a predetermined set of enterprise-specified SDEs, which can refer to proprietary or otherwise sensitive enterprise or personal information in terms, phrases, names, and so on.

An LLM hallucination test can include an automated evaluation that ensures an LLM response message from the LLM service 109 does not include "hallucinations" or respond with false information. LLMs can sometimes generate responses that seem plausible but are actually inaccurate, fictional, or unsupported by facts. These inaccurate LLM responses can be referred to as "hallucinations." The LLM hallucination test can check whether the responses received from the LLM service 109 are factually accurate according to a predetermined and stored knowledge base. An LLM hallucination test can, in some examples, also check whether the LLM input messages are factually accurate according to a predetermined and stored factual knowledge base.

A prompt injection test can include an automated evaluation that analyzes the LLM application 130 to identify whether malicious prompt injections have been introduced into a message, for example, by an attacker in an attack on the LLM service 109, an LLM application 130, or a web page. The web page can be provided and/or protected by the LLM security service 103 for interactions with an LLM service 109 and its LLM.

The various LLM tests can, in some examples, include a test that checks whether the text, to and from network addresses, executable code, and other data of the message indicates prompt injection, hallucinations, SDE leakage, bias, harmful content, and/or other disapproved information, according to the LLM security libraries 136.

In some examples, the LLM test data 139 can include code that executes the LLM test. In further examples, LLM test data 139 can include local or remote network communication addresses and authentication information to access the LLM test. The LLM test data 139 can also include information that describes the LLM test, such as its provider, type or purpose, a set of approval status options for the test, a signature algorithm to use when creating an attestation for the LLM test, and other information.

The LLM message data 142 can include a log of messages stored in relation to a particular LLM service 109 or LLM, an LLM application 130, a user, and other data. A message can include an input message to be provided as input to an LLM, or an original response message. The LLM message data 142 can associate each message with a particular LLM service 109 or LLM, an LLM application 130, a user, an approval status of the message such as approved or disapproved, as well as a modified message generated by the LLM security service 103.

The LLM security service 103 can include a service that provides LLM security sandboxes 120 for client side sanitation of LLM messages. In some examples, the LLM security service 103 can work in concert with a client side application installed on the client device 106. The LLM security service 103 can transmit a command that causes an agent, a browser, or another client application 160 on the client device 106 to use an LLM security sandbox 120 to sanitize communications with a specified LLM service 109.

Sanitation can include approval and disapproval of LLM messages, modification of disapproved LLM messages, logging security issues identified, and providing notifications to users and/or administrators when messages are disapproved. The agent can transmit data to the LLM security service 103 in order to maintain a log of the LLM message data 142. This can include the original message, the sanitized message, and the reasons for the change. The LLM security service 103 can provide a user interface that indicates a reason for the sanitization, and a description of how to avoid a disapproval in future message interactions. A word, phrase, or other information can be visually emphasized in the user-entered message to indicate a security issue with the message, along with a textual description of why the information is disapproved.

The LLM security sandbox 120 can provide client side sanitation by performing the various LLM tests on messages between the client device 106 and the LLM services 109. This can include sanitation of LLM input messages from the client device 106 to the LLM service 109, as well as LLM response messages from the LLM service 109 to the client device 106. The LLM security sandbox 120 can provide an isolated environment with restricted access to the rest of the system and software of the client device 106. The LLM security sandbox 120 can contain executable sanitation processes in an environment where messages can be analyzed and corrected. This can prevent disapproved content from being transmitted from the client device 106 to the LLM service 109 and can also prevent disapproved content received from the LLM service 109 from reaching portions of the client device 106 outside the LLM security sandbox 120. The LLM security sandbox 120 can restrict or prevent access to all or a subset of file systems, network resources, and system interfaces.

The LLM security sandbox 120 can provide approved messages for display using a browser or other client application 160. In other words, the LLM security sandbox 120 can enable certain processes of the LLM security sandbox 120, such as a message modification process and a message moderator process, to output approved messages for display using a browser or other client application 160. Some implementations of the LLM security sandbox 120 can enable access to predefined programmatic interfaces, such as Application Programming Interfaces (APIs), through network endpoints of the LLM security service 103. For example, the LLM security sandbox 120 can transmit messages and context data to the LLM security service 103, the LLM security service 103 can use the LLM security libraries 136 to perform LLM tests, and the results can be returned to the LLM security sandbox 120. The LLM security sandbox 120 can also transmit results of message modifications and LLM tests for storage as LLM message data 142.

The client device 106 is representative of a plurality of client devices 106 that can be coupled to the network 112. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 154, such as liquid crystal displays (LCDs), gas plasma-based flat panel displays, organic light emitting diode (OLED) displays, electrophoretic ink ("E-ink") displays, projectors, or other types of display devices. In some instances, the displays 154 can be a component of the client device 106 or can be connected to the client device 106 through a wired or wireless connection.

The client device 106 can be configured to execute various applications such as a client application 160 or other applications. The client application 160 can be executed in a client device 106 to access network content served up by the computing environment 101 or other servers, thereby rendering a user interface 157 on the displays 154. To this end, the client application 160 can include an LLM application 130, a browser, a dedicated application, or other executable, and the user interface 157 can include a network page, an application screen, or other user mechanism for obtaining user input. The client device 106 can be configured to execute client applications 160 such as browser applications, chat applications, messaging applications, email applications, social networking applications, word processors, spreadsheets, or other applications.

The LLM service 109 can refer to an online platform or service that provides access to LLMs like GPT-3 (Generative Pre-trained Transformer 3), or other types of generative artificial intelligence models. The LLM service 109 can include a chatbot service or another type of service that allows developers, researchers, and businesses to develop LLM applications 130 that integrate the textual language generation capabilities of LLMs. LLM services 109 can include pre-trained models that have been trained on a large amount of text data. The LLMs learn and identify patterns in grammar and semantics in order to generate coherent and contextually relevant text. LLM services 109 can use natural language processing to perform tasks such as text generation, summarization, translation, sentiment analysis, question answering, text completion and other language-based processes. LLM services 109 can expose one or more APIs that enable LLM applications 130, the LLM security service 103, and other endpoints to send input messages and receive response messages from an LLM.

Figure 2:
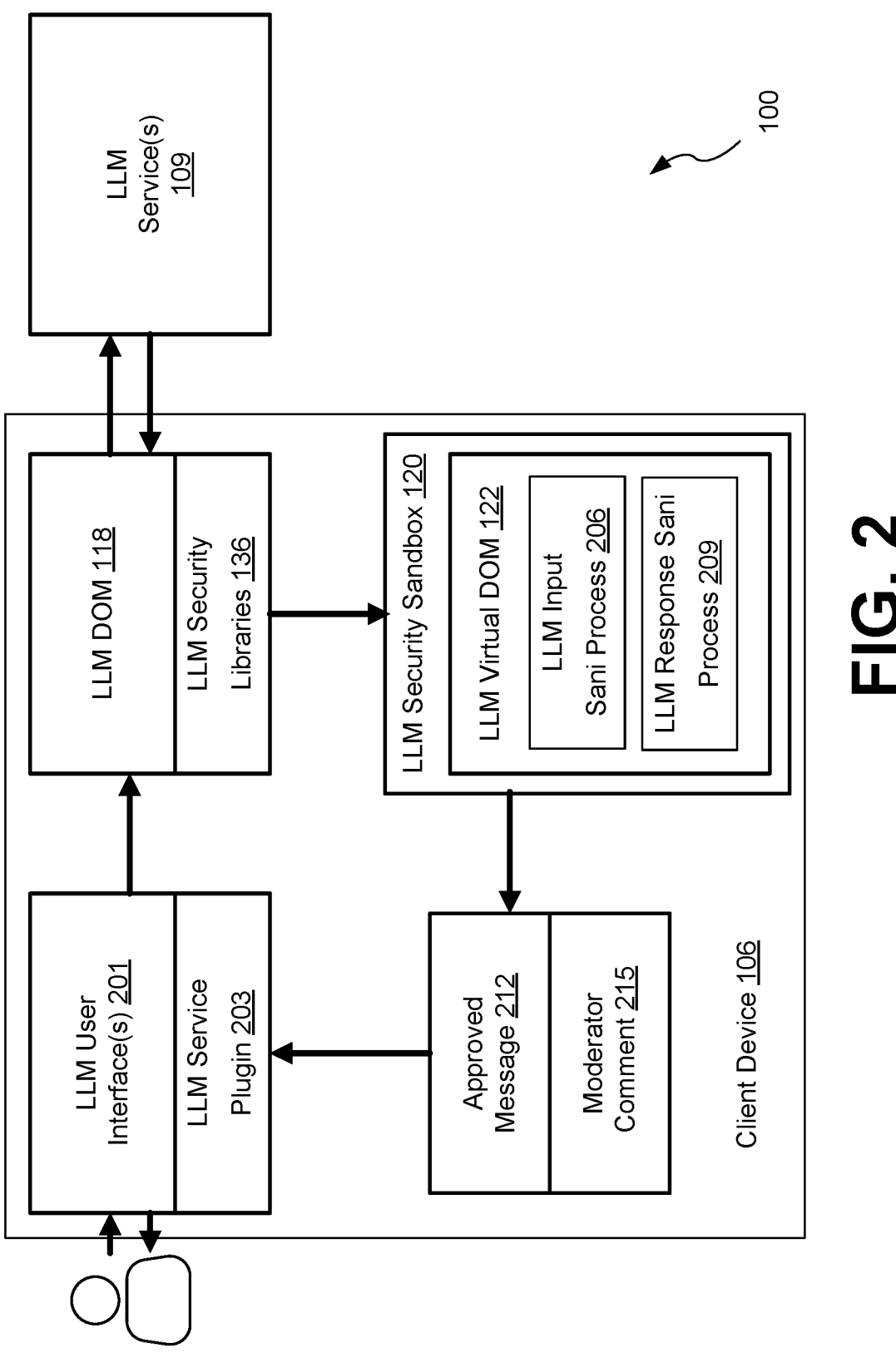
FIG. 2 illustrates an example of implementing LLM interaction security sandboxing using the components of the networked environment of FIG. 1 according to various embodiments of the present disclosure.

FIG. 2 shows an example of the operation of LLM interaction security sandboxing using the components of the networked environment 100. In this example, the environment 100 can include the client device 106 and the LLM service 109. The client device 106 can provide an LLM user interface 201, an LLM integration component such as an LLM service plugin 203, an LLM DOM 118, the LLM security libraries 136, an LLM security sandbox 120 that performs LLM input and response sanitization, and an LLM service 109.

The LLM user interface 201 can be an example of a browser user interface for a web page or web application, a user interface of an LLM application 130, or a user interface of any client application 160 that accesses an LLM service 109. The LLM user interface 201 can include a user interface that is generated according to the LLM DOM 118 for a web page or web application that interacts with an LLM service 109.

The LLM user interface 201 can prompt a user to provide a message input such as a textual message or another type of message. Once formed, an LLM input message can include textual data and tag data. Tag data can indicate whether the approved message is original or modified, and can further indicate topics, fields, and other contextual information. The LLM user interface 201 can include an LLM service plugin 203. The LLM service plugin 203 can be provided by the LLM service 109 to enable the browser or LLM user interface 201 to communicate with the LLM service 109. This can include providing the network endpoint data and authentication data for communications. However, in other examples, the LLM user interface 201 can include this functionality without an additional plugin.

The browser or client application 160 providing the LLM user interface can use the LLM DOM 118 to represent and interact with the structure and content of a web page or application that uses the LLM service 109. The LLM security libraries 136 can cause an agent, browser, or other client application 160 to create the LLM security sandbox 120 once the LLM user interface 201 is generated. An agent, browser, or another client application 160 can detect that the LLM user interface 201 is generated and create the LLM security sandbox 120 based at least in part on its generation. The LLM security sandbox 120 can include LLM communications sanitization processes including LLM input sanitization process 206 and LLM response sanitization process 209. In some examples, the functionality described for the LLM input sanitization process 206 and the LLM response sanitization process 209 can be performed using a single communications sanitization process of the LLM security sandbox 120. The LLM security sandbox 120 can also include all or a portion of the LLM security libraries 136.

The LLM input sanitization process 206 can include a process that performs all or a portion of the LLM tests from the LLM security libraries 136 on LLM input messages provided through prompts in the LLM user interface 201. The LLM response sanitization process 209 can include a process that performs all or a portion of the LLM tests of the LLM security libraries 136 on LLM response messages received from the LLM service 109. For example, the LLM input sanitization process 206 can include a security process utilized by an enterprise to ensure predetermined information including, SDEs, harmful content, biases, malicious prompt injections, and so on are not allowed to be transmitted from the client device 106 Existing technologies also rely on the LLM to omit harmful content, biases, malicious prompt injections, and LLM hallucinations and other inappropriate information is not entered into a user interface by a user of a client device 106 for transmission to an LLM.

Once an original message is tested using the LLM input sanitization process 206 or the LLM response sanitization process 209, the LLM security sandbox 120 can provide an approved message 212 and a moderator comment. The moderator comment can be a message or natural language text that indicates a result of the LLM tests of the LLM input sanitization process 206 or the LLM response sanitization process 209.

The approved message 212 can include a tested and approved original message, or a modified message generated by the LLM input sanitization process 206, the LLM response sanitization process 209, or another component of the LLM security sandbox 120. In examples where the approved message 212 is the original message, the moderator comment can include a natural language message indicating that the original message is approved. A moderator tag or tags can also indicate that the original message is approved. The moderator comment and the moderator tags can indicate which LLM tests were performed and approved of the original message.

If the approved message 212 is a modified message, the moderator comment can indicate a reason the modified message is modified. The moderator comment can include a natural language comment that indicates a type of LLM test that disapproved the message and initiated the modification. The moderator comment can also indicate which terms were modified or caused the disapproval. A moderator LLM of the LLM security sandbox 120 can generate the modified message and the moderator comment.

Figure 3:
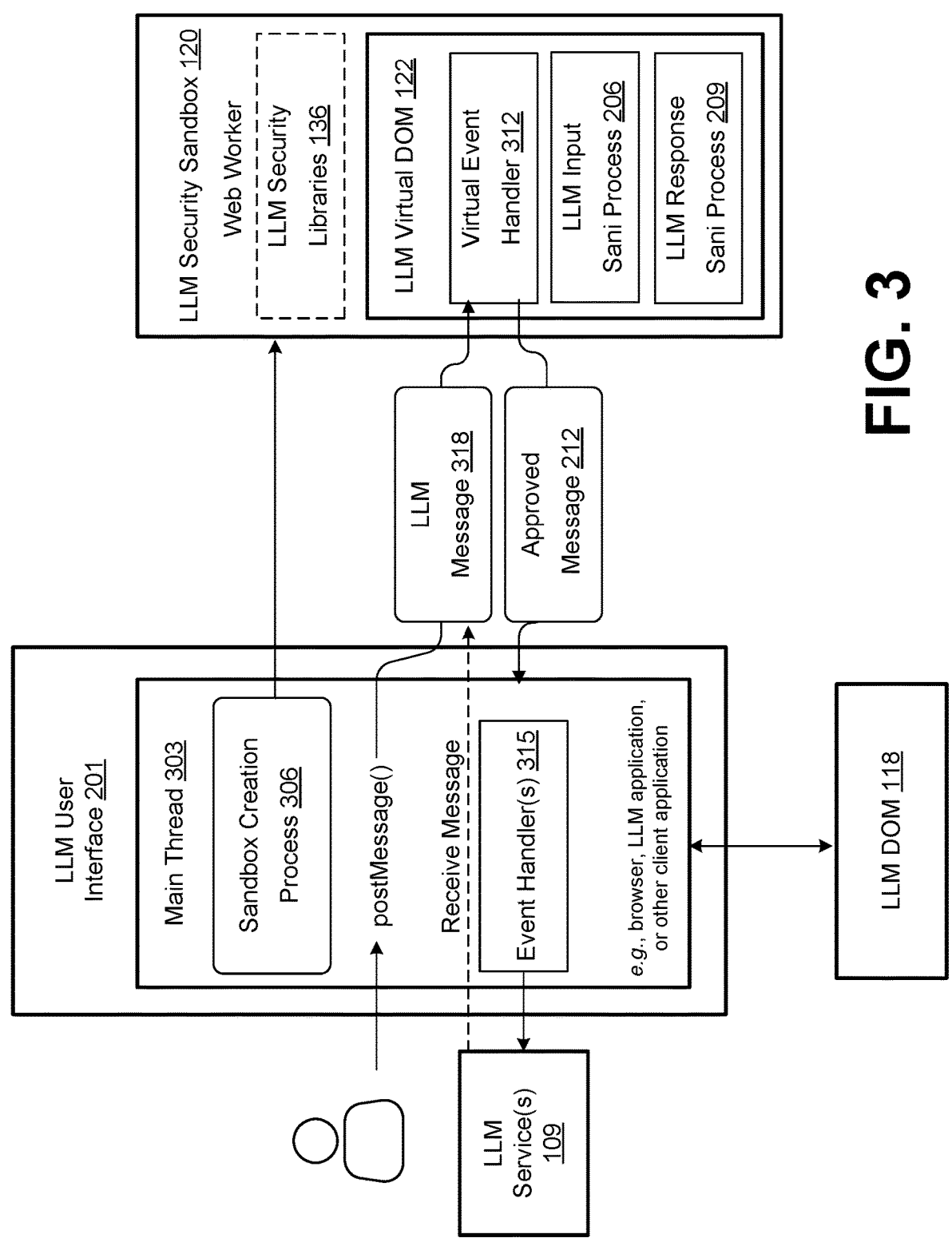
FIG. 3 illustrates another example of implementing LLM interaction security sandboxing using the components of the networked environment of FIG. 1 according to various embodiments of the present disclosure.

FIG. 3 illustrates another example of implementing LLM interaction security sandboxing using the components of the networked environment of FIG. 1 according to various embodiments of the present disclosure. This example shows how a main thread 303 of a client application 160 creates the LLM security sandbox 120 that performs sanitation of communications with the LLM service 109.

As indicated earlier, the LLM user interface 201 can be an example of a browser user interface for a web page or web application, a user interface of an LLM application 130, or a user interface of any client application 160 that accesses an LLM service 109. A web application can include client device 106 local execution, server-side execution, or hybrid execution using both client-side and server-side components performing at least some of the functionalities. The LLM user interface 201 can include a user interface that is generated according to an LLM DOM 118 for a web page or web application that interacts with an LLM service 109. While the main thread 303 is shown as part or subcomponent of the LLM user interface 201, the main thread 303 can alternatively refer to a thread separate from a user interface thread and the LLM user interface 201. For example, if a single-threaded user interface framework is used, the main thread 303 can be responsible for handling user input, updating the user interface components, and responding to events. However, if a multi-thread framework is used, the main thread 303 can be responsible for general application operation, while a separate user interface thread of the LLM user interface 201 handles the user interface tasks. The user interface thread can execute portions of the main program, and modify its state for which the main thread 303 can receive or identify state changes and perform additional computations. In other words, interactions with, and states of, the LLM user interface 201 can cause the main thread 303 to launch the LLM security sandbox 120. While the LLM security sandbox 120 or sandbox web worker is shown separately from the LLM user interface 201, it can alternatively be considered a subcomponent or process of the LLM user interface 201.

The main thread 303 can detect that the LLM user interface 201 is generated or requested and create the LLM security sandbox 120 in response. The main thread 303 can use a web worker or another sandbox creation process 306 to create the LLM security sandbox 120. The main thread 303 can execute the sandbox creation process 306 based at least in part on detecting generation of the LLM user interface 201, detecting a request to access a web page or web application, detecting a loading of a message prompt, or another event. In some examples, an agent application can detect that the LLM user interface 201 is generated and can request or command the main thread 303 to create the LLM security sandbox 120. The LLM security sandbox 120 can include processes including LLM input sanitization process 206 and LLM response sanitization process 209. The LLM security sandbox 120 can also include all or a portion of the LLM security libraries 136, and a virtual event handler 312.

The virtual event handler 312 of the LLM virtual DOM 122 can correspond to a modified version of the event handler 315. The event handler 315 can be an original event handler in an LLM DOM 118 of a web page or web application that communicates with the LLM service 109. The LLM virtual DOM 122 can modify the event handler 315 of the LLM DOM 118 to include, invoke, or otherwise utilize LLM input sanitization process 206 and LLM response sanitization process 209 processes.

The LLM user interface 201 can prompt a user to provide an LLM input message such as a textual message or another type of message. The message can also include tags that can be user selected or automatically appended to the message by the LLM user interface 201. Once formed, the LLM message 318 can include textual data and tag data that indicates topics, fields, and other contextual information. The main thread 303 can provide the LLM message 318 to the virtual event handler 312 of the LLM virtual DOM 122.

In an instance in which the LLM message 318 corresponds to an LLM input message, the LLM message 318 can include information that indicates that the LLM message 318 is addressed to the LLM service 109. The virtual event handler 312 can identify that the LLM message 318 is addressed to the LLM service 109 or is entered through a prompt of the LLM user interface 201 that sends messages to the LLM service 109. The virtual event handler 312 can provide the LLM message 318 to the LLM input sanitization process 206.

The LLM input sanitization process 206 can include a process that performs all or a portion of the LLM tests from the LLM security libraries 136 on LLM input messages provided through prompts in the LLM user interface 201.

The LLM response sanitization process 209 can include a process that performs all or a portion of the LLM tests of the LLM security libraries 136 on LLM response messages received from the LLM service 109.

When an LLM input message is identified through the LLM user interface 201, the LLM security sandbox 120 can intercept the message and execute the LLM input sanitization process 206 to approve or disapprove an original LLM input message. The LLM input sanitization process 206 can identify fingerprint data and context data for the client device 106 and the session with the LLM service 109. The LLM input sanitization process 206 can use the fingerprint data to identify a subset of the LLM tests to perform for the LLM input message, in the context of the current messaging or chat session.

If the LLM input sanitization process 206 approves the original message, the LLM security sandbox 120 can forward the original message as an approved message 212 to the LLM service 109. However, if the original message is disapproved, the LLM security sandbox 120 can use the moderator LLM or other components of the LLM security libraries 136 to generate a modified or sanitized message. The sanitized message can be used in the approved message 212. The LLM security sandbox 120 can transmit the modified message to the LLM service 109. The LLM security sandbox 120 can also generate a moderator comment that provide a natural language explanation indicating that the original message was modified, and why it was modified. This can indicate what type(s) of LLM test(s) have requested the modification.

The moderator comment can be provided in the LLM user interface 201 so the user understands that the original message was modified. In some cases, the LLM user interface 201 can prompt the user to accept the modified message before forwarding the modified message to the LLM service 109. A portion or snippet of the original message that caused the message to fail the LLM test can be highlighted, bolded, otherwise emphasized, and included along with the moderator comment.

An LLM message 318 can alternatively include an LLM response message received from the LLM service 109. The LLM message 318 can include information that indicates that the LLM message 318 is received from an endpoint of the LLM service 109 or is addressed to an endpoint of a client application 160 that generates the LLM user interface 201. The LLM security sandbox 120 can intercept the message and execute the LLM response sanitization process 209 to approve or disapprove an original LLM response message.

The LLM response sanitization process 209 can identify fingerprint data and context data for the client device 106 and the session with the LLM service 109. The LLM response sanitization process 209 can use the fingerprint data to identify a subset of the LLM tests to perform for the LLM input message, in the context of the current messaging or chat session.

If the LLM response sanitization process 209 approves the original LLM response message, the LLM security sandbox 120 can provide the approved message 212 to the LLM user interface 201. However, if the original message is disapproved, the LLM security sandbox 120 can use the moderator LLM or other components of the LLM security libraries 136 to generate a modified or sanitized message. The LLM security sandbox 120 can provide the modified message to the LLM user interface 201.

The LLM security sandbox 120 can also generate a moderator comment that provide a natural language explanation indicating that the original LLM response message was modified, and why it was modified. In some examples, moderator comments can be omitted from response messages as extraneous information relative to the user. However, the moderator comment can still be generated, stored, and transmitted to the LLM security service 103 as LLM message data 142 for administrative review. The moderator comment can indicate what type of LLM test was failed. A portion or snippet of the original message that caused the message to fail the LLM test can be highlighted, bolded, otherwise emphasized, and included along with the moderator comment.

The fingerprint data can include one or more parameters that form a browser fingerprint for a browser, an application fingerprint for a non-browser client application 160, or a client fingerprint associated with a client identifier or the client device 106. The fingerprints can also be referred to as chat fingerprints, since the LLM user interface 201 can provide the chat user interface. The parameters of the fingerprint data can include browser attributes, application attributes, or other chat user interface attributes that are detected using transmissions between the LLM user interface 201 and the LLM service 109. The parameters can include a browser or application identifier and version, a device model of the client device 106, an operating system identifier and version of the client device 106, a time zone of the client device 106, preferred language settings of the browser, whether an ad blocker was used in relation to the browser and/or client device 106, the screen resolution of the client device 106, which installed fonts are present in the client device 106, a hardware specification of the client device 106, and/or a script- or application-generated image of the browser and/or client device 106, among other attributes. The fingerprint data can include a fingerprint such as a hash computed using a hash algorithm and at least a portion of the fingerprint data. Alternatively, the fingerprint can include any data structure that includes or is generated using at least a portion of the fingerprint data.

Figure 4:
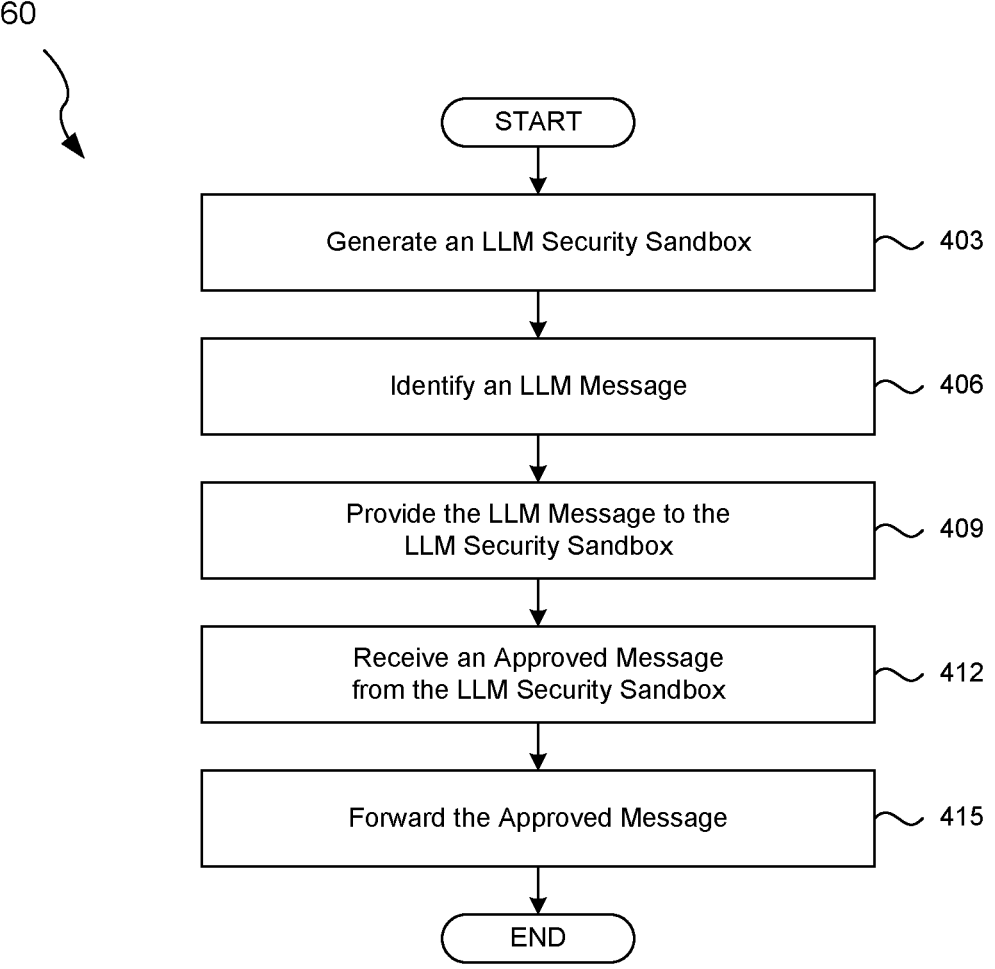
FIG. 4 is a flowchart illustrating aspects of LLM interaction security sandboxing, according to various embodiments of the present disclosure.

FIG. 4 shows a flowchart providing an example of LLM interaction security sandboxing implemented using components of the networked environment 100. The flowchart provides merely an example of the many different types of functional arrangements that can be employed to implement the depicted interactions between the components of the networked environment 100. As an alternative, the flowchart can be viewed as depicting an example of elements of a method implemented within the networked environment 100. While blocks are generally described as performed using the client device 106, this can include instructions executed by one or more client applications 160 outside of the LLM security sandbox 120. Aspects of the blocks can also be executed using the LLM security sandbox 120 and other components of the networked environment 100.

In block 403, the client device 106 can generate an LLM security sandbox 120. The client device 106 can execute a client application 160 that communicates with an LLM service 109. For example, the client application 160 can access a website or web application that communicates with the LLM service 109. The client application 160 can additionally or alternatively correspond to an LLM application 130 that communicates with the LLM service 109. The client application 160 can generate an LLM security sandbox 120 to ensure that LLM messages transmitted between the client device 106 and the LLM service 109 are sanitized or otherwise approved.

In block 406, the client device 106 can identify an LLM message 318. For example, an LLM user interface 201 of a client application 160 can prompt a user to provide an LLM input message for the LLM service 109. The client application 160 can also receive an LLM response message from the LLM service 109. The LLM message 318 can include a textual message such as a character string. The LLM message 318 can also include tags that can be user selected or automatically appended to the message. Once formed, the LLM message 318 can include textual data and tag data that indicates topics, fields, and other contextual information.

In block 409, the client device 106 can provide the LLM message 318 to the LLM security sandbox 120. The client application 160 can identify LLM messages 318 and redirect them to the LLM security sandbox 120. In some examples, the client application 160 can identify whether the LLM message 318 is an LLM input message or an LLM response message based at least in part on a source network address and a destination network address indicated in the LLM message 318. The client application 160 can provide the LLM security sandbox with an indication of whether the LLM message 318 is an LLM input message or an LLM response message. The client application 160 can also identify fingerprint data and provide it to the LLM security sandbox 120 with the LLM message 318. Alternatively, the LLM security sandbox 120 can identify whether the LLM message 318 is an LLM input message or an LLM response message, and can identify fingerprint data from the LLM message 318 itself.

In block 412, the client device 106 can receive an approved message 212 from the LLM security sandbox 120. The LLM security sandbox 120 can perform an LLM input sanitization process 206 or an LLM response sanitization process 209 and generate an approved message 212 as described in more detail with respect to FIG. 5. The approved message 212 (or unapproved message data) can include textual data and tag data. The textual data can correspond to the original message or a modified message. Tag data can indicate whether the approved message is original or modified, and can further indicate topics, fields, and other contextual information. In some examples, tag data can specify to perform a remedial action such as ending a communication session between the client device 106 and the LLM service 109. A component of the client device 106 such as a client application 160 can perform the remedial action.

In block 415, the client device 106 can forward the approved message 212. For example, the client application 160 can forward an approved LLM response message to a user by generating an LLM user interface 201. The client application 160 can forward an approved LLM input message to an LLM service 109 by transmitting the approved message 212 over a network 112. Alternatively, the LLM security sandbox 120 can have access to a limited set of approved outbound network connections that includes the LLM service 109.

Figure 5:
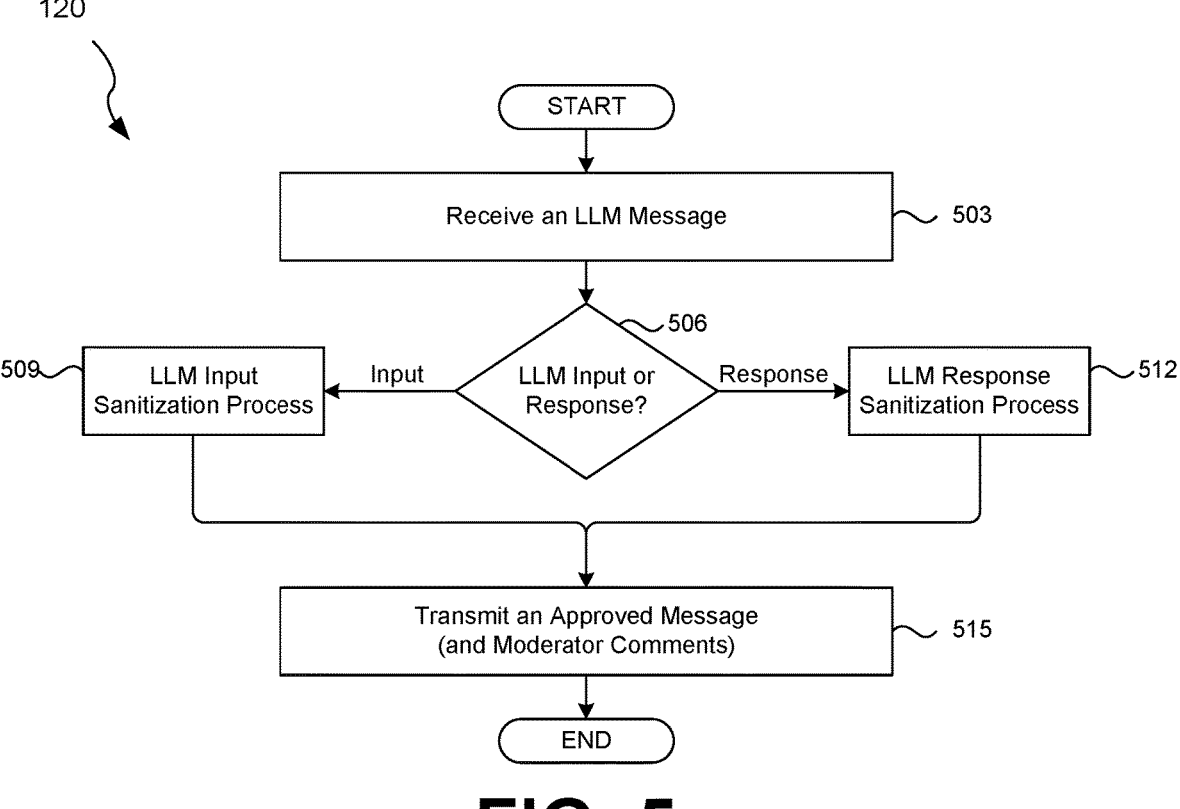
FIG. 5 is another flowchart illustrating aspects of LLM interaction security sandboxing, according to various embodiments of the present disclosure.

FIG. 5 shows a flowchart providing an example of LLM interaction security sandboxing implemented using components of the networked environment 100. The flowchart provides merely an example of the many different types of functional arrangements that can be employed to implement the depicted interactions between the components of the networked environment 100. As an alternative, the flowchart can be viewed as depicting an example of elements of a method implemented within the networked environment 100. While blocks are generally described as performed using the LLM security sandbox 120 of the client device 106, this can include instructions executed by and performed in concert with client applications 160 outside of LLM security sandbox 120. Aspects of the blocks can also be executed using other components of the networked environment 100.

In block 503, the LLM security sandbox 120 can receive an LLM message 318. The LLM security sandbox 120 can receive the LLM message from a client application 160 such as a browser, an agent, or another component of the client device 106 outside the LLM security sandbox 120. When an LLM input message is identified through the LLM user interface 201, the LLM security sandbox 120 can intercept the message and determine which sanitation process to perform.

In block 506, the LLM security sandbox 120 can determine whether the LLM message 318 is an LLM input message or an LLM response message. The LLM security sandbox 120 can identify whether the LLM message 318 is an LLM input message or an LLM response message based at least in part on source data and destination data indicated in the LLM message 318. The source data can include a network address or an identifier that indicates a source of the LLM message 318. The source can refer to the LLM service 109, or a component of the client device 106, such as the client application 160. The destination data can include a network address or an identifier that indicates a destination for the LLM message 318. The destination can refer to the LLM service 109, or a component of the client device 106, such as the client application 160. If the source corresponds to the client device 106 and/or the destination corresponds to the LLM service 109, then the LLM message can be an LLM input message and the process can move to block 509. If the source corresponds to the LLM service 109 and/or the destination corresponds to the client device 106, then the LLM message can be an LLM response message and the process can move to block 512.

In block 509, the LLM security sandbox 120 can perform the LLM input sanitation process 206. The LLM input sanitization process 206 can perform a selected set of LLM tests for an LLM input message. In some examples, the LLM input sanitization process 206 can identify fingerprint data and context data for the client device 106 and the session with the LLM service 109. This can include an identity of the LLM service 109. The LLM input sanitization process 206 can use the fingerprint data to identify a subset of the LLM tests to perform for the LLM input message, in the context of the current messaging or chat session. If the LLM input sanitization process 206 approves the original message, then the LLM security sandbox 120 can use the original message as an approved message 212. However, if the original message is disapproved, the LLM security sandbox 120 can use the moderator LLM and other components of the LLM security libraries 136 to generate a modified or sanitized message. The sanitized message can be used in the approved message 212. The process can move to step 515.

In block 512, the LLM security sandbox 120 can perform the LLM response sanitation process 209. The LLM response sanitation process 209 can perform a selected set of LLM tests for an LLM response message. In some examples, the LLM response sanitation process 209 can identify fingerprint data and context data for the client device 106 and the session with the LLM service 109. This can include an identity of the LLM service 109. The LLM response sanitation process 209 can use the fingerprint data to identify a subset of the LLM tests to perform for the LLM response message, in the context of the current messaging or chat session. If the LLM response sanitation process 209 approves the original message, then the LLM security sandbox 120 can use the original message as an approved message 212. However, if the original message is disapproved, the LLM security sandbox 120 can use the moderator LLM and other components of the LLM security libraries 136 to generate a modified or sanitized message. The sanitized message can be used for the approved message 212. The process can move to step 515.

In step 515, the LLM security sandbox 120 can transmit an approved message 212. The approved message 212 can include or be accompanied with moderator comments for display in the client application 160. The LLM security sandbox 120 can return the approved message 212 and the moderator comments to the client application 160. In an instance in which the approved message 212 is an LLM input message, the client application 160 can transmit the LLM input message to the LLM service 109. Alternatively, the LLM security sandbox 120 can transmit the approved message 212 to the LLM service 109. In an instance in which the approved message 212 is an LLM response message, the client application 160 can show the approved message in the LLM user interface 201. In either case, the client application 160 can show the moderator comments in the LLM user interface 201.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages could be added to the logical flow described herein, for purposes of enhanced utility, accounting, performance measurement, or providing troubleshooting aids, etc. It is understood that all such variations are within the scope of the present disclosure.

The sequence diagrams and flowcharts provide a general description of the operation of the various components. Although the general descriptions can provide provides an example of the interactions between the various components, other interactions between the various components are also possible according to various embodiments of the present disclosure. Interactions described with respect to a particular figure or sequence diagram can also be performed in relation to the other figures and sequence diagrams herein.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a client device comprising at least one processor and at least one memory; and
machine-readable instructions stored in the at least one memory that, when executed by the at least one processor, cause the client device to at least:
create, in the client device, a Large Language Model (LLM) security sandbox comprising at least one LLM communications sanitization process;

provide an LLM message to the LLM security sandbox, wherein the LLM message is generated or received for communications over a network with an LLM service;
receive, from the LLM security sandbox, an approved LLM message generated based at least in part on performing the at least one LLM communications sanitization process on the LLM message; and
provide access to the approved LLM message by at least:
generating a user interface that includes the approved LLM message, or transmitting the approved LLM message to the LLM service over the network.

2. The system of claim 1, wherein the approved LLM message is a modified version of the LLM message.

3. The system of claim 2, wherein the modified version of the LLM message is generated using a moderator LLM in the LLM security sandbox.

4. The system of claim 1, wherein the LLM security sandbox comprises an LLM virtual Document Object Model (DOM) that is a virtual representation of an LLM DOM for a web page or a web application.

5. The system of claim 1, wherein the LLM message is an LLM input message entered through a user prompt.

6. The system of claim 1, wherein the LLM message is an LLM response received from the LLM service based at least in part on an LLM input message.

7. The system of claim 1, wherein the approved LLM message is provided with a moderator comment that indicates a result of the at least one LLM communications sanitization process.

8. A method, comprising:
executing, by a client device, a Large Language Model (LLM) security sandbox, wherein the LLM security sandbox comprises at least one LLM communications sanitization process;
identifying, by the client device, an LLM message generated or received for communications with an LLM service over a network;
performing, by the client device, the at least one LLM communications sanitization process on the LLM message to generate an approved LLM message; and
providing, by the client device, access to the approved LLM message by at least:
generating a user interface that includes the approved LLM message, or transmitting the approved LLM message from the client device to the LLM service over the network.

9. The method of claim 8, further comprising:
generating, by the client device, a moderator comment that indicates a result of the at least one LLM communications sanitization process.

10. The method of claim 8, wherein the approved LLM message is a modified version of the LLM message.

11. The method of claim 10, wherein the modified version of the LLM message is generated using a moderator LLM in the LLM security sandbox.

12. The method of claim 8, wherein the LLM security sandbox comprises an LLM virtual Document Object Model (DOM) that is a virtual representation of an LLM DOM for a web page or a web application.

13. The method of claim 8, wherein the LLM message is an LLM input message entered through a user prompt.

14. The method of claim 8, wherein the LLM message is an LLM response received from the LLM service based at least in part on an LLM input message.

15. A system, comprising:

at least one computing device comprising at least one processor and at least one memory; and machine-readable instructions stored in the at least one memory that, when executed by the at least one processor, cause the at least one computing device to at least:

execute a Large Language Model (LLM) security sandbox using a client device, wherein the LLM security sandbox comprises at least one LLM communications sanitization process;

identify an LLM message generated or received for communications with an LLM service over a network;

perform the at least one LLM communications sanitization process on the LLM message to generate an approved LLM message; and provide access to the approved LLM message by at least:

generating a user interface that includes the approved LLM message, or transmitting the approved LLM message from the client device to the LLM service over the network.

16. The system of claim 15, wherein the approved LLM message is a modified version of the LLM message.

17. The system of claim 16, wherein the modified version of the LLM message is generated using a moderator LLM in the LLM security sandbox.

18. The system of claim 15, wherein the LLM security sandbox comprises an LLM virtual Document Object Model (DOM) that is a virtual representation of an LLM DOM for a web page or a web application.

19. The system of claim 15, wherein the LLM message is an LLM input message entered through a user prompt.

20. The system of claim 15, wherein the LLM message is an LLM response received from the LLM service based at least in part on an LLM input message.

* * * * *